United States Patent [19]

Lawrence

[11] 4,058,375

[45] Nov. 15, 1977

[54] AMMONIA RECOVERY BY SCRUBBING AND CONDENSING

[75] Inventor: Jackson Lawrence, Troy, N.Y.

[73] Assignee: Cluett, Peabody & Co., Inc., New York, N.Y.

[21] Appl. No.: 635,056

[22] Filed: Nov. 25, 1975

Related U.S. Application Data

[63] Continuation-in-part of Ser. No. 542,386, Jan. 20, 1975, abandoned, which is a continuation of Ser. No. 393,605, Aug. 31, 1973, abandoned.

[51] Int. Cl.² .................. B01D 47/02; B01D 47/06
[52] U.S. Cl. .................................. 55/70; 55/95
[58] Field of Search ............. 55/18, 19, 70, 84, 94, 55/95, 223, 244, 240, 249

[56] References Cited

U.S. PATENT DOCUMENTS

| | | | |
|---|---|---|---|
| 3,005,849 | 10/1961 | Otsuka | 55/70 |
| 3,344,585 | 10/1967 | Hollowell | 55/70 |
| 3,386,228 | 4/1968 | Hartmann | 55/68 |
| 3,460,319 | 8/1969 | Tkach | 55/19 |
| 3,561,194 | 2/1971 | Baldwin et al. | 55/249 |

*Primary Examiner*—Wilbur L. Bascomb, Jr.
*Assistant Examiner*—E. Rollins Cross

[57] ABSTRACT

This invention teaches a method and apparatus for recovering ammonia from a waste gas mixture comprising ammonia with air, and water vapor or steam. The waste gas is bubbled upwardly through an aqueous bath in a condenser, and then through a scrubber in direct contact with a spray of fresh water. The scrubber and condenser are formed integrally so that fresh ammonia water from the scrubber joins the aqueous bath in the condenser. The temperature of the aqueous bath is controlled, preferably by sensing the temperature thereof to control flow of cooling fluid in noncontact heat exchange with the aqueous bath in the condenser. Aqueous ammonia from the bath is withdrawn as product, but it is recycled to the bath if its ammonia concentration is inadequate.

4 Claims, 1 Drawing Figure

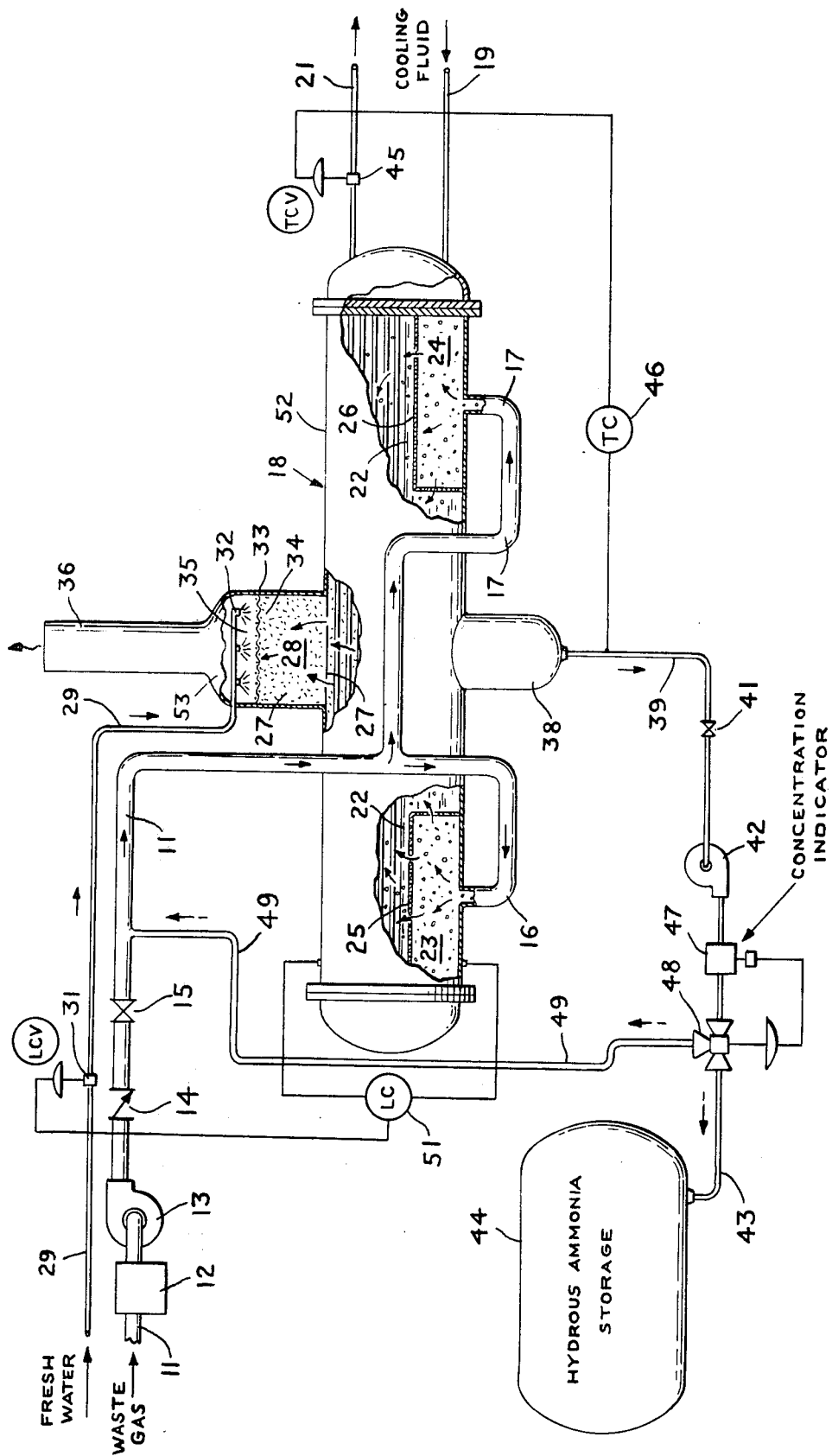

AMMONIA RECOVERY BY SCRUBBING AND CONDENSING

BACKGROUND OF THE INVENTION

This application is a Continuation-in-Part of application Ser. No. 542,386, filed Jan. 20, 1975, now abandoned, which, in turn, is a Streamlined Continuation of application Ser. No. 393,605, filed Aug. 31, 1973, now abandoned.

In recent years with such developments as permanent press garments and industrial applications requiring textiles to be formed into specific shapes, there has been increased emphasis on treatment of fabrics with liquid ammonia. Large quantities of ammonia find their way into such processes, and there is a resultant need for disposing of or reclaiming the ammonia. As a pollutant, the ammonia is offensive per se. The ammonia also acts as a fertilizer when discharged into natural streams aggravating weed growth. Unfortunately, recovery of ammonia after use in textile treatment is expensive and, therefore, has not been pursued to any great extent. Textile mills find more rewarding ways to invest capital than in ammonia recovery systems.

In many cases where large quantities of ammonia are used, methods of recovery and reuse are feasible economically with recovery efficiencies generally as high as 90%. Usually recovery of residual ammonia content beyond the 90% has been uneconomical and disposal thereof has been required. In other situations, however, where lesser quantities of ammonia are used, and in situations where the ammonia occurs with large quantities of air, water vapor, or steam, recovery of the spent ammonia is not economical. In such situations, disposal of the ammonia containing waste has been accomplished by discharge into natural streams or by incineration.

There is, therefore, a need for ammonia recovery methods and systems from ammonia treatment discharge, within the operational and economic parameters of the textile industry. This is particularly the case since there is a need in a number of applications for aqueous ammonia in concentrations of from 20 to 30%. Ordinarily, this ammonia is made conventionally by diluting anhydrous ammonia with water. Accordingly, the above noted problems in reclaiming ammonia from waste discharge having a content of ammonia of marginal economic attractiveness may be usefully coped with, providing, as noted above, it can be recovered economically.

STATEMENT OF THE INVENTION

This invention provides a useful and economically sound method and recovery system for recovering ammonia in marginal concentration from discharge flow from textile treatment plants. This is achieved through the use of a condenser. A water bath is maintained in the condenser and a cooling fluid is circulated in noncontact heat exchange with the bath. A vented scrubber is positioned above and in flow communication with the condenser. The waste stream to be treated, discharged from a textile treatment plant, comprising a mixture of ammonia with air, water vapor and/or steam is introduced into the water bath of the condenser and bubbled upward through the bath so that a portion of the ammonia in the waste stream is absorbed in the water bath. The remaining waste gas stream with a lesser ammonia content is discharged upwardly to the scrubber. The partly treated gas is scrubbed by fresh water passing downwardly through the scrubber so that the fresh water absorbs additional ammonia therefrom resulting in a substantially ammonia-free gas mixture which passes upwardly to the vent. The resulting water with absorbed ammonia flows downwardly to join the ammonia containing water bath in the condenser. A product, preferably comprising between 20 and 30% ammonia by weight in water, is withdrawn from the bath.

The condenser and the scrubber are, preferably, formed in a single housing with the condenser having a generally horizontal elongated cylindrical configuration, with the scrubber positioned midway of the condenser's length and projecting upwardly therefrom. Temperature of the condenser water bath is controlled by the flow of cooling water in noncontact heat exchange therewith. The product may be recycled for further concentration if its ammonia content is insufficient.

Before describing this invention in more detail, it may be well to note that a typical composition of a waste stream to be treated, in accordance with this invention, is substantially gaseous and comprises within the range of between 8 and 30% air, within the range of between about 225 and 275 lbs. per hour of steam, and within the range of between about 300 and 500 lbs. per hour of ammonia. It is under pressure when introduced into the system of within the range of between about $-2$ inches to 3 inches of water, and is pressurized to about 30 inches of water, prior to treatment. This waste gas stream, after initial treatment in the condenser water bath will comprise within the range of between about 88 and 90% air with the remainder being residual ammonia. After the second treatment with counterflow scrubbing, the discharged gas from the system will contain within the range of between about 99.25 and 99.75% air with the remainder ammonia, an acceptable level for pollution control.

DESCRIPTION OF THE DRAWING

The foregoing and other objects, features and advantages will appear more fully from the following detailed description of the invention viewed in conjunction with the accompanying drawing which is a somewhat diagrammatic illustration of a system embodying the principles of the invention.

DETAILED DESCRIPTION OF THE INVENTION

As can be seen from the drawing, a waste gas feed (containing ammonia with air, water vapor and/or steam) enters the system via line 11, a filter 12, a blower 13, a flow controller 14 and a damper 15. The blower pressurizes the incoming waste gas to about 30 inches of water, so that the gas velocity is at a proper level to maintain the liquid level in the water and to minimize entrained liquid droplets in the discharged gas. The waste gas line 11 is divided into two lines 16 and 17 for entry into a condenser 18. The condenser 18 is divided into a tube side and a shell side. The tube side communicates with the lines 19 and 21 for circulation of a cooling fluid (usually water) therethrough. The shell side of the condenser contains a water bath 22.

The waste gas from the lines 16, 17 is admitted into two chambers 23, 24 respectively (defined by two baffle plates 25, 26 respectively) for distribution along the length of the condenser 18 and for bubbling the waste gas upwardly through bath 22 so that a portion of the ammonia from the waste gas is absorbed by bath 22. A resulting waste gas 27 with a reduced ammonia content of about 10% passes upwardly to a scrubber 28 located above condenser 18, and in flow communication therewith.

In scrubber 28 the waste gas 27 is washed with fresh water. The fresh water is introduced via a line 29, a control valve 31 and spray nozzles 32. Atomizing means, shown as mesh 33, are included to assure that the fresh water is broken up into many fine droplets 34. The fresh water droplets 34 pass downwardly through the scrubber 28 in direct physical contact with the waste gas mixture 27 with reduced ammonia content so as to absorb additional ammonia therefrom resulting in a substantially ammonia free gas mixture 35 (containing about 0.50% ammonia) which passes upwardly via a vent stack 36. The fresh water 34, containing ammonia removed from the gas 27, flows donwardly to join water bath 22 in the shell side of condenser 18.

Hydrous ammonia product, with an ammonia content by weight from 20 to 30% or more, is withdrawn from the shell side of condenser 18 via a well 38, a line 39, a valve 41, a pump 42 and a line 43 to a storage tank 44. Flow of cooling fluid via line 19, the tube side of the condenser 18 and line 21 is controlled by a control valve 45 which is regulated by a temperature controller 46. The temperature range of bath 22 is maintained within the range of between about 50° and 75° F.

A concentration indicator 47 is connected operatively with line 41 and measures a suitable electrical property of the product as a function of ammonia concentration. The concentration indicator 47 is connected to operate a three way valve 48 to channel the product either via the line 43 to the storage tank 44 or via a line 49 to the line 11 for recycle to the aqueous bath 22 until the product reaches the desired ammonia concentration. As noted above, the method and apparatus of the invention are particularly appropriate for treating ammonia containing waste gas streams of relatively low ammonia concentration, to, in turn, secure aqueous ammonia solutions with concentrations of between about 20 and 30%, a typically useful concentration for many applications. Such concentrations were secured, in the past, by diluting fresh anhydrous ammonia. Thus, the invention here serves two useful purposes, including securing a useful product from a waste gas considered economically unattractive in the past, and disposing of a potentially contaminating waste gas.

Input of fresh water via the line 29 and spray nozzles 32 is controlled by the level control valve 31 which is regulated by a level controller 51 connected operatively to condenser 18.

Scrubber 28 and condenser 18 are fabricated preferably in a single housing 52, for simplicity and economy. The condenser 18 has a generally horizontal elongated cylindrical configuration and the scrubber 28 is arranged midway relative to the condenser's length, and projects upwardly therefrom. The scrubber 28 has a generally vertical configuration terminating in an upper end 53 on which the vent stack 36 is mounted. The well 38 provides depth to the aqueous bath 22 so that enrichment of ammonia content can be achieved even as hydrous ammonia product is withdrawn via line 39 to storage tank 44.

For clarity of presentation various control, safety interlock and other features have been eliminated from the system as shown. It will be understood by those familiar with scrubbing systems, condensers and the like that various deviations may be made from the shown embodiment without departing from a main theme of invention set forth in claims which follow.

I claim:

1. A method for removing ammonia from a waste gas mixture from a textile treatment chamber and containing ammonia, air and water vapor or steam, and having a first treatment zone containing a body of water and a second treatment zone in flow communication with said first treatment zone; characterized in comprising the steps of
   a. maintaining said first treatment zone and said body of water at a predetermined temperature;
   b. bringing said waste gas mixture to a pressure of about 30 inches of water and bubbling said mixture upwardly through said first treatment zone and said body of water to dissolve a first quantity of ammonia from said mixture into said body of water;
   c. flowing said waste gas mixture to said second treatment zone;
   d. exposing said waste gas mixture to a countercurrent flow of water droplets in said second treatment zone to dissolve a second quantity of ammonia from said mixture, said water droplets with said second quantity of ammonia flowing to said body of water;
   e. removing said waste gas mixture from said second treatment zone;
   f. continuously removing a portion of said body of water containing said first and second dissolved quantities of ammonia as product;
   g. measuring the percentage of ammonia content in said product; and
   h. recycling said product back to said first and second treatment zones until said product from said measuring step reaches a predetermined ammonia content.

2. The method of claim 1, further characterized by
   a. said maintaining step being carried out at a temperature within the range of between about 50° and 75° F.

3. The method of claim 1, further characterized by
   a. said predetermined ammonia content being within the range of between about 20 and 30 percent by weight of the withdrawn product.

4. The method of claim 1, further characterized by
   a. said waste gas mixture containing within the range of between about 8 and 30% air, within the range of between about 225 and 275 pounds per hour of steam, and within the range of between about 300 and 500 lbs. per hour of ammonia.

* * * * *